United States Patent [19]

Maruyama

[11] Patent Number: 5,555,147
[45] Date of Patent: Sep. 10, 1996

[54] MR/INDUCTIVE COMBINED THIN FILM MAGNETIC HEAD CAPABLE OF REDUCING OCCURRENCE OF A SHORT CIRCUIT

[75] Inventor: Takao Maruyama, Tokyo, Japan

[73] Assignee: NEC Corporation, Tokyo, Japan

[21] Appl. No.: 311,709

[22] Filed: Sep. 23, 1994

Related U.S. Application Data

[63] Continuation of Ser. No. 49,414, Apr. 20, 1993, abandoned.

[30] Foreign Application Priority Data

Apr. 20, 1992 [JP] Japan .................................... 4-099468

[51] Int. Cl.⁶ ......................................................... G11B 5/33
[52] U.S. Cl. ........................................................... 360/113
[58] Field of Search ..................................... 360/111, 113, 360/123, 125, 126, 122; 324/252; 338/32 R

[56] References Cited

U.S. PATENT DOCUMENTS

| | | | |
|---|---|---|---|
| 3,975,772 | 8/1976 | Lin | 360/113 |
| 4,555,740 | 11/1985 | Jackson et al. | 360/113 |
| 4,935,832 | 6/1990 | Das et al. | 360/112 |

FOREIGN PATENT DOCUMENTS

| | | | |
|---|---|---|---|
| 58-220240 | 12/1983 | Japan | 360/113 |
| 61-248211 | 11/1986 | Japan | 360/122 |
| 61-276110 | 12/1986 | Japan | 360/113 |
| 210511 | 1/1990 | Japan . | |
| 3156712 | 7/1991 | Japan . | |

*Primary Examiner*—Stuart S. Levy
*Assistant Examiner*—William J. Klimowicz
*Attorney, Agent, or Firm*—Sughrue, Mion, Zinn, Macpeak & Seas

[57] ABSTRACT

In a combined thin film magnetic head comprising reading and recording parts which are formed on a main surface of a non-magnetic substrate for magnetically reading and recording information on a magnetic recording medium, the reading part comprises an under shield pattern, an upper shield pattern, and a magneto-resistive element formed between the under and the upper shield patterns. The under and the upper shield patterns have restricted areas which are much smaller than the main surface of the non-magnetic substrate. The recording part comprises a conductor member with a coil pattern. An outer periphery portion of the coil pattern is out of a forming area which is for forming the reading part.

6 Claims, 4 Drawing Sheets

MR/INDUCTIVE COMBINED THIN FILM MAGNETIC HEAD CAPABLE OF REDUCING OCCURRENCE OF A SHORT CIRCUIT

This is a Continuation of application Ser. No. 08/049,414 filed Apr. 20, 1993, now abandoned.

BACKGROUND OF THE INVENTION

This invention relates to a combined thin film magnetic head for magnetically reading and recording information on a magnetic recording medium. Such a combined thin film magnetic head is particularly useful in a magnetic disc unit.

Such a combined thin film magnetic head comprises a reading part and a recording part which are formed through a first insulator layer on a non-magnetic substrate to overlap each other. The reading part is for magnetically reading information on a magnetic recording medium with reading sensitivity. The recording part is for magnetically recording the information on the magnetic recording medium. The non-magnetic substrate has a main surface for forming the reading part and the recording part and a substrate side end defining an air bearing surface for the magnetic recording medium. The reading part comprises an under shield layer formed on the first insulator layer, an upper shield layer covering the under shield layer, and an MR (magneto-resistive) element formed between the under and the upper shield layers through a second insulator layer. The magneto-resistive element is for magnetically reproducing the information on the magnetic recording medium and produces a reproduced output voltage. For this purpose, the magneto-resistive element is supplied with a sense current as known in the art. The recording part is formed over the reading part.

Each of the under and the upper shield layers is generally made of a permalloy film and has a shield area substantially equal, in size, to the main surface of the non-magnetic substrate. The magneto-resistive element has an element pattern which is much smaller than the shield area. The magneto-resistive element is connected to first and second element terminals through first and second wiring patterns both of which are formed between the under and the upper shield layers through the second insulator layer. The first and the second wiring patterns are made of non-magnetic metal material to flow the sense current. In such a combined thin film magnetic head, it is possible to independently optimize recording characteristic and reproducing characteristic. Furthermore, if a recording width is wider than a reproducing width, it is possible to increase a read margin on off-tracking. Such a combined thin film magnetic head is generally called a wide write/narrow read type or an MR/inductive combined thin film magnetic head and can improve performance of a magnetic disc unit.

It should be noted here that a space between the magneto-resistive element and the under shield layer is, generally, within the bounds of 0.1 through 0.5 micron meters. The space between the first and the second wiring patterns and the under shield layer is equal to the above-mentioned value. This applies to the space between the magneto-resistive element and the upper shield layer and the space between the first and the second wiring patterns and the upper shield layer. In other words, the second insulator layer between the first and the second wiring patterns and the under shield layer is very thin. This applies to the second insulator layer between the first and the second wiring patterns and the upper shield layer. In this event, defects, such as a pin hole, often occur in the second insulator layer. In other words, a short circuit is formed between the first and the second wiring patterns and the upper or the under shield layer. The short circuit causes a shunt current of the sense current flowing the first and the second wiring patterns. The shunt current causes not only degradation of the reading sensitivity but also occurrence of signal noises.

SUMMARY OF THE INVENTION

It is therefore an object of the present invention to provide a combined thin film magnetic head which is hard to form a short circuit between wiring patterns for a magneto-resistive element and an upper or an under shield layer.

Other objects of the present invention will become clear as the description proceeds.

On describing the gist of this invention, it is possible to understand that a combined thin film magnetic head comprises reading and recording means formed through a first insulator layer on a non-magnetic substrate for magnetically reading and recording information on a magnetic recording medium, respectively. The non-magnetic substrate has a substrate side end defining an air bearing surface for the magnetic recording medium. The reading means comprises a magneto-resistive element having an element pattern and an element side end lying in the same plane of the air bearing surface. The recording means comprises a conductor member with a coil pattern having an outer periphery portion. The first insulator layer has a forming area for forming the reading means and non-forming area adjoining the forming area.

According to this invention, the reading means further comprises an under shield pattern which is formed under the magneto-resistive element in the forming area through a second insulator layer. The under shield pattern has a first under shield side end lying in the same plane of the air bearing surface and a second under shield side end opposite to the first under shield side end. The reading means further comprises an upper shield pattern which covers the magneto-resistive element in the forming area through the second insulator layer. The upper shield pattern has a first upper shield side end lying in the same plane of the air bearing surface and a second upper shield side end opposite to the first upper shield side end. The recording means further comprises an under yoke pattern lying over on the recording means and the non-forming area and having a first under yoke side end lying in the same plane of the air bearing surface and a second under yoke side end opposite to the first under yoke side end, and an upper yoke pattern overlying on the under yoke pattern and having a first upper yoke side end lying in the same plane of the air bearing surface and a second upper yoke side end opposite to the first upper yoke side end and connected to the second under yoke side end to form a magnetic headcore having a magnetic gap between the first under and the first upper yoke side ends. The conductor member is formed through a third insulator layer between the under and the upper yoke patterns so that the coil pattern surrounds a connection portion between the second under and the second upper yoke side ends and that the outer periphery portion is out of the forming area.

DESCRIPTION OF THE PREFERRED EMBODIMENT

Figure 1:
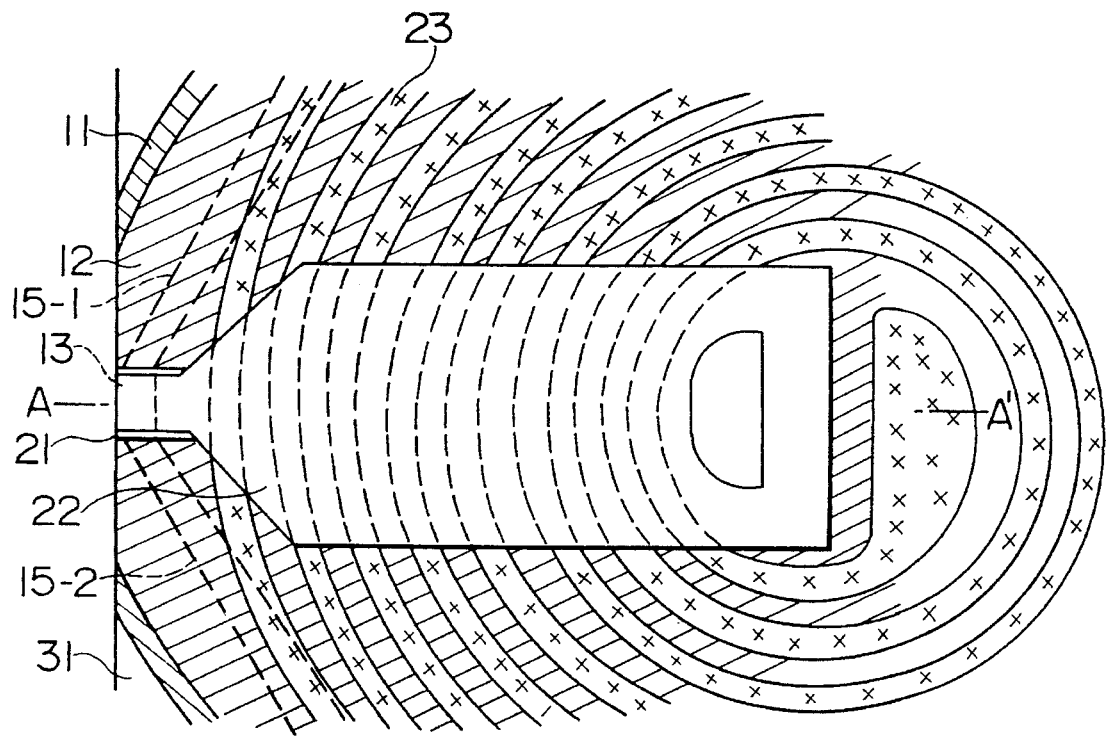
FIG. 1 is a schematic plan view of a conventional combined thin film magnetic head.
Figure 2:
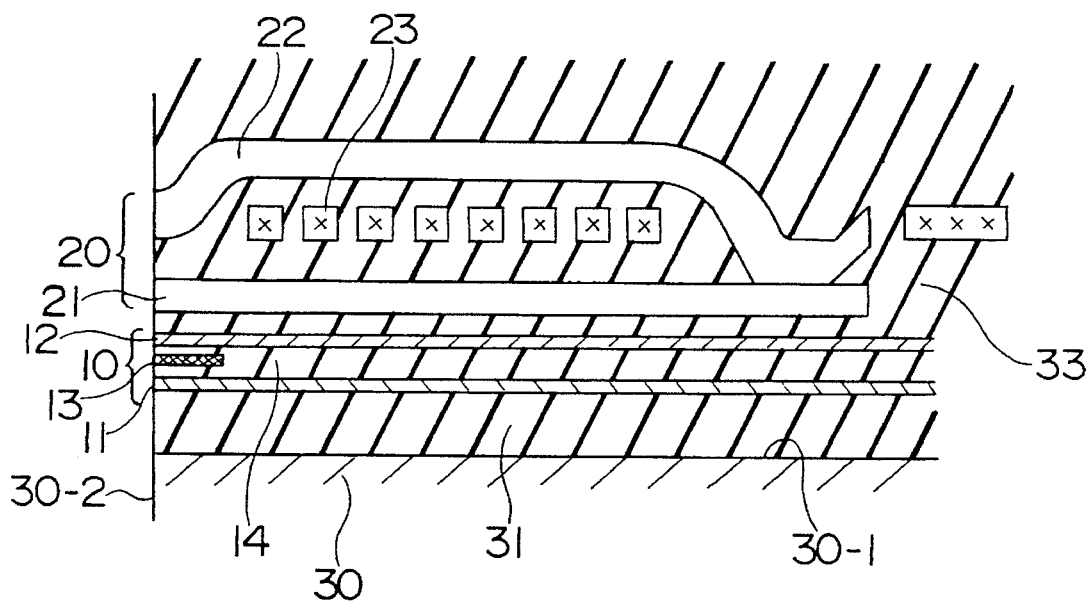
FIG. 2 is a sectional view taken on line A—A' in FIG. 1.

Referring to FIGS. 1 and 2, a conventional combined thin film magnetic head will be described at first in order to facilitate an understanding of the present invention. The combined thin film magnetic head is particularly useful in a magnetic disc unit. The combined thin film magnetic head comprises a reading part 10 and a recording part 20 which are formed through a first insulator layer 31 on a non-magnetic substrate 30 to overlap each other. The non-magnetic substrate 30 is made of ceramic and has a main surface 30-1 for forming the reading part 10 and the recording part 20 and a substrate side end defining an air bearing surface 30-2 for a magnetic recording medium (not shown). The first insulator layer 31 is made of $Al_2O_3$.

The reading part 10 is for magnetically reading information on the magnetic recording medium with reading sensitivity. The reading part 10 comprises an under shield layer 11 formed on the first insulator layer 31, an upper shield layer 12 covering the under shield layer 11, and a magneto-resistive element 13 formed between the under and the upper shield layers 11 and 12 through a second insulator layer 14. The under and the upper shield layers 11 and 12 have under and upper shield side ends, respectively, lying in the same plane of the air bearing surface 30-2.

Similarly, the magneto-resistive element 13 has an element side end lying in the same plane of the air bearing surface 30-2 and an element pattern which is much smaller than the main surface 30-1. The magneto-resistive element 13 detects or senses magnetic flux emanated from a specific area, namely, an opposite area of the element side end, of the magnetic recording medium. Each of the under and the upper shield layers 11 and 12 is used for improving resolution of the magneto-resistive element 13. Namely, the under and the upper shield layers 11 and 12 absorb the magnetic flux emanated from outside area of the specific area in the magnetic recording medium. For this purpose, each of the under and the upper shield layers 11 and 12 is made of a permalloy film and has a shield area substantially equal, in size, to the main surface 30-1 of the non-magnetic substrate 30.

As well known in the art, the magneto-resistive element 13 comprises a permalloy thin film (not shown) having magneto-resistive and bias films (not shown) formed on upper and under surfaces of the permalloy thin film. The bias films are for magnetically giving bias to the permalloy thin film in a manner known in the art. For example, hard-magnetic material is used as the bias films in the manner which is called a hard-film bias method. In the manner which is called a soft-film bias method, soft-magnetic material is used as the bias films. The magneto-resistive element 13 produces a reproduced output voltage on sensing the magnetic flux emanated from the magnetic recording medium.

As will later become clear, the magneto-resistive element 13 is connected to first and second element terminals (not shown) through first and second wiring patterns 15-1 and 15-2 which are formed between the under and the upper shield layers 11 and 12 through the second insulator layer 14. The first and the second wiring patterns 15-1 and 15-2 are made of non-magnetic metal material, such as gold, tungsten, or the like. The first and the second wiring patterns 15-1 and 15-2 are used for supplying the reproduced output voltage to a signal processing circuit (not shown) and are for supplying a sense current to the magneto-resistive element 13.

The recording part 20 is formed on the upper shield layer 12 through a third insulator layer 33. The recording part 20 is for magnetically recording the information on the magnetic recording medium. The recording part 20 comprises an under yoke pattern 21, an upper yoke pattern 22 overlying on the under yoke pattern 21, and a conductor member 23 with a coil pattern. The under and the upper yoke patterns 21 and 22 are made of a permalloy film while the conductor member 23 is made of copper. The second and the third insulator layers 14 and 33 are made of $Al_2O_3$.

The under yoke pattern 21 has a first under yoke side end lying in the same plane of the air bearing surface 30-2 and a second under yoke side end opposite to the first under yoke side end. Similarly, the upper yoke pattern 22 has a first upper yoke side end lying in the same plane of the air bearing surface 30-2 and a second upper yoke side end opposite to the first upper yoke side end. As illustrated in FIG. 1, each of the first under and the first upper yoke side ends is tapered. The second upper yoke side end is connected to the second under yoke side end to form a magnetic headcore having a magnetic gap between the first upper yoke side end and the first under yoke side end.

In FIG. 1, the second and the third insulator layers 14 and 33 are not illustrated for brevity of description. Although only a part of the coil pattern is illustrated in FIG. 1, the conductor member 23 has an outer periphery portion near the air bearing surface. The conductor member 23 is formed between the under and the upper yoke patterns 21 and 22 so that the coil pattern surrounds a connection portion between the second under and the second upper yoke side ends.

It is to be noted here that a space between the magneto-resistive element 13 and the under shield layer 11 is within the bounds of 0.1 through 0.5 micron meters. The space between the first and the second wiring patterns 15-1 and 15-2 and the under shield layer 11 is equal to the above-mentioned value. This applies to the space between the magneto-resistive element 13 and the upper shield layer 12 and the space between the first and the second wiring patterns 15-1 and 15-2 and the upper shield layer 12. In other words, the second insulator layer 14 is very thin. In this event, a pin hole often occurs in the second insulator layer 14. In other words, a short circuit is often formed between the first and the second wiring patterns 15-1 and 15-2 and the under shield layer 11 or the upper shield layer 12. This is because the under and the upper shield layers 11 and 12 have wide areas which are substantially equal to the main surface of the non-magnetic substrate 30 and because the whole of the first and the second wiring patterns 15-1 and 15-2 are opposite to the under shield layer 11 and the upper shield layer 12. The short circuit causes a shunt current of the sense current supplied to the magneto-resistive element 13. The shunt current causes not only degradation of the reading sensitivity but also occurrence of signal noises.

Figure 3:
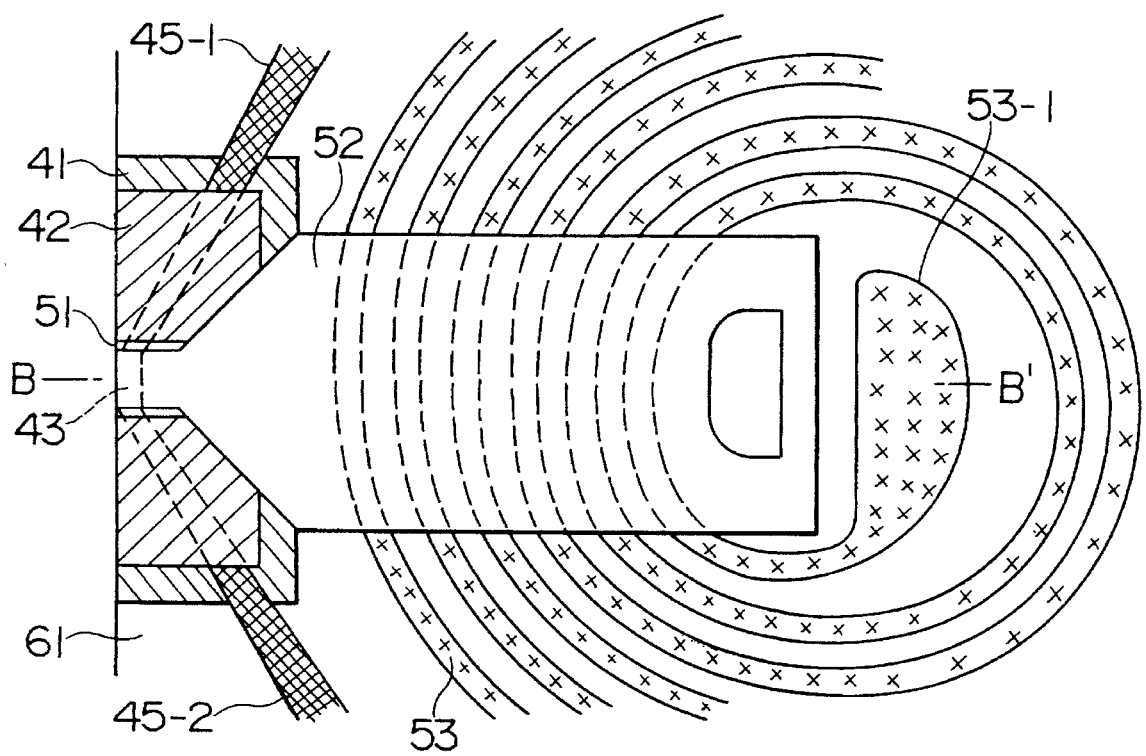
FIG. 3 is a schematic plan view of a combined thin film magnetic head according to a first embodiment of this invention.
Figure 4:
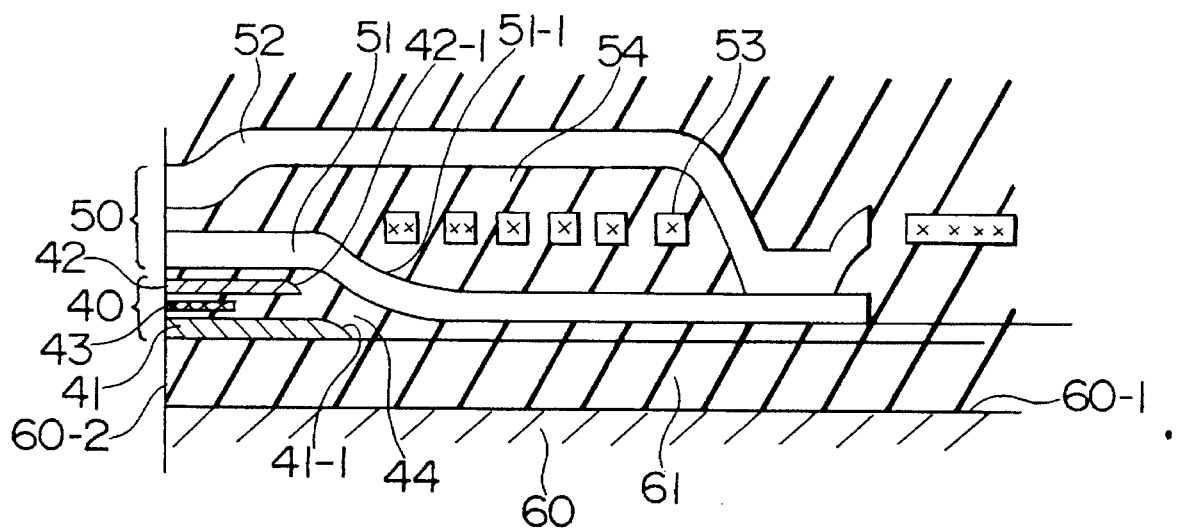
FIG. 4 is a sectional view taken on line B—B' in FIG. 3.
Figure 5:
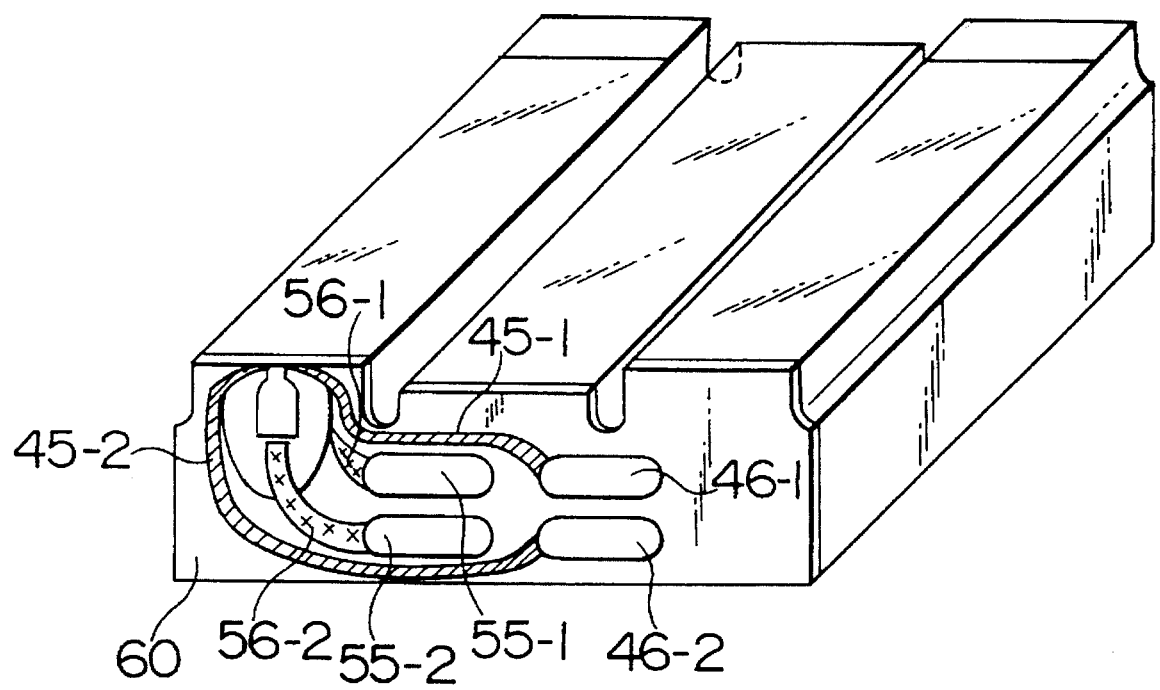
FIG. 5 is a schematic representation for describing mounted configuration of the combined thin film magnetic head illustrated in FIGS. 3 and 4.

Referring to FIGS. 3 to 5, the description will proceed to a combined thin film magnetic head according to a first embodiment of this invention. The combined thin film magnetic head comprises a reading part 40 and a recording part 50 which are formed through a first insulator layer 61 on a non-magnetic substrate 60. The non-magnetic substrate 60 is made of ceramic and has a main surface 60-1 and a substrate side end defining an air bearing surface 60-2 for the magnetic recording medium (not shown). The first insulator layer 61 is made of Al$_2$O$_3$ and has a forming area for forming the reading part 40 and a non-forming area adjoining the forming area. The non-forming area is used for the recording part 50.

The reading part 40 comprises an under shield pattern 41 formed on the forming area of the first insulator layer 61, an upper shield pattern 42 covering the under shield pattern 41, and a magneto-resistive element 43 formed between the under and the upper shield patterns 41 and 42 through a second insulator layer 44. The under and the upper shield patterns 41 and 42 have first under and first upper shield side ends, respectively, lying in the same plane of the air bearing surface 60-2. The under and the upper shield patterns 41 and 42 are made of permalloy films and have under and upper shield areas both of which are much smaller than the main surface 60-1 as shown in FIG. 3. The under shield pattern 41 has a second under shield side end opposite to the first under shield side end. The upper shield pattern 42 has a second upper shield side end opposite to the first upper shield side end. The upper shield area is a little smaller than the under shield area. As mentioned in conjunction with FIG. 2, the under and the upper shield patterns 41 and 42 are used for improving the resolution of the magneto-resistive element 43.

The magneto-resistive element 43 is similar to that illustrated in FIG. 2 and has an element side end lying in the same plane of the air bearing surface 60-2 and an element pattern which is enough smaller than the under and the upper shield patterns 41 and 42. The magneto-resistive element 43 is connected to first and second element terminals 46-1 and 46-2 (FIG. 5) through first and second wiring patterns 45-1 and 45-2 both of which are formed between the under and the upper shield patterns 41 and 42 through the second insulator layer 44. The first and the second wiring patterns 45-1 and 45-2 are made of non-magnetic metal material, such as gold, tungsten, or the like. The first and the second element terminals 46-1 and 46-2 are formed on the non-magnetic substrate 60.

It should be noted here that the under and the upper shield patterns 41 and 42 are much smaller, in size, than the under and the upper shield layers 11 and 12 shown in FIG. 1. This means that an opposite portion between the first wiring pattern 45-1 and the under shield pattern 41 is much smaller than that between the first wiring pattern 15-1 and the under shield layer 11 illustrated in FIG. 2. Similarly, the opposite portion between the first wiring pattern 55-1 and the upper shield pattern 42 is very small. This applies to the second wiring pattern 45-2 and the under and the upper shield patterns 41 and 42. Accordingly, it is possible to reduce possibility of forming of the short circuit described in conjunction with FIGS. 1 and 2 because the opposite portion between the first wiring pattern 45-1 and the under or the upper shield pattern 41 or 42 and between the second wiring pattern 45-2 and the under or the upper shield pattern 41 or 42. Moreover, the under and the upper shield patterns 41 and 42 have slopes 41-1 and 42-1 at the second under and the second upper shield side ends, respectively. Technical merit of the slopes 41-1 and 42-1 will later become clear.

Most of the recording part 50 is formed on the non-forming area of the first insulator layer 61 through the second insulator layer 44. The recording part 50 comprises an under yoke pattern 51 formed on the second insulator layer 44, an upper yoke pattern 52 overlying on the under yoke pattern 51, and a conductor member 53 with a coil pattern. The under and the upper yoke patterns 51 and 52 are made of permalloy films while the conductor member 53 is made of copper.

The under yoke pattern 51 has a first under yoke side end lying in the same plane of the air bearing surface 60-2 and a second under yoke side end opposite to the first under yoke side end. Similarly, the upper yoke pattern 52 has a first upper yoke side end lying in the same plane of the air bearing surface 60-2 and a second upper yoke side end opposite to the first upper yoke side end. Each of the first under and the first upper yoke side ends is tapered. The second upper yoke side end is connected to the second under yoke side end to form a magnetic headcore having a magnetic gap between the first upper yoke side end and the first under yoke side end.

Although only a part of the coil pattern is illustrated in FIG. 3, the conductor member 53 has an outer periphery portion near the second under and the second upper shield side ends. The conductor member 53 is formed through a third insulator layer 54 between the under and the upper yoke patterns 51 and 52 so that the coil pattern surrounds a connection portion between the second under and the second upper yoke side ends. It is to be noted here that the under yoke pattern 51 has a curved portion 51-1 which is down along the slopes 41-1 and 42-1. As a result, the most of the under yoke pattern 51 sinks at a level substantially equal to the magneto-resistive element 43. On the other hand, it is required that the coil pattern is flatly formed in high accuracy. For the reason, the conductor member 53 is formed on a flat surface in the third insulator layer 54 so that outer peripheral portion thereof is out of the forming area for the reading part 40, namely, out of the under and the upper shield patterns 41 and 42. This means that the conductor member 53 can be formed on a level lower than the conductor member 23 shown in FIG. 2 without the influence of the curved portion 51-1. As a result, a thickness of the combined thin film magnetic head can be reduced relative to the conventional combined thin film magnetic head described in conjunction with FIGS. 1 and 2.

In addition, if the outer periphery portion of the conductor member 53 is too apart from the magnetic gap of the magnetic headcore, the magnetic headcore has an increased magnetic circuit length. This causes an increment of a magnetic resistance of the magnetic headcore. Under the circumstances, it is desirable to shorten a distance between the magnetic gap of the magnetic headcore and the outer periphery portion of the conductor member 53 in order to reduce the magnetic resistance of the magnetic headcore. For this purpose, the under shield pattern 41 has a first upper limit in length between the first and the second under shield side ends. Similarly, the upper shield pattern 42 has a second upper limit between the first and the second upper shield side ends. Moreover, each of the under and the upper shield patterns 41 and 42 has a lower limit in thickness from the point of view of shield effect for the magneto-resistive element 43. For example, it is desirable that each of the under and the upper shield patterns 41 and 42 has the thickness which is equal to 10 through 20 micron meters.

As known in the art, the under and the upper shield layers 41 and 42, the magneto-resistive element 43, the under and the upper yoke patterns 51 and 52, and the conductor member 53 are formed in the manner of high frequency sputtering method, electroplating method, or the like and are patterned in the manner of photo-lithography technique, etching technique, or the like.

In FIG. 5, the combined thin film magnetic head is symbolically depicted at 100. The coil pattern of the conductor member has an inside end 53-1 (FIG. 3) and an outside end (not shown) located at outside thereof. The inside and the outside ends of the coil pattern are connected to first and second coil terminals 55-1 and 55-2 through first and second coil lead patterns 56-1 and 56-2, respectively.

Figure 6:
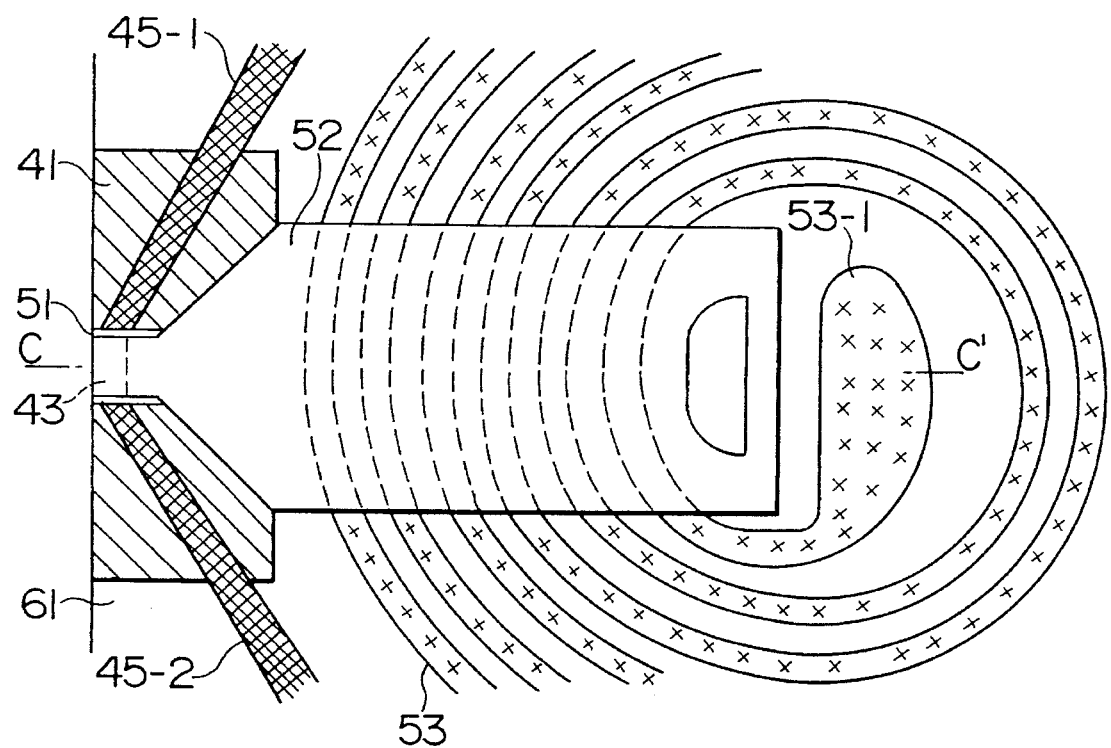
FIG. 6 is a schematic plan view of a combined thin film magnetic head according to a second embodiment of this invention.
Figure 7:
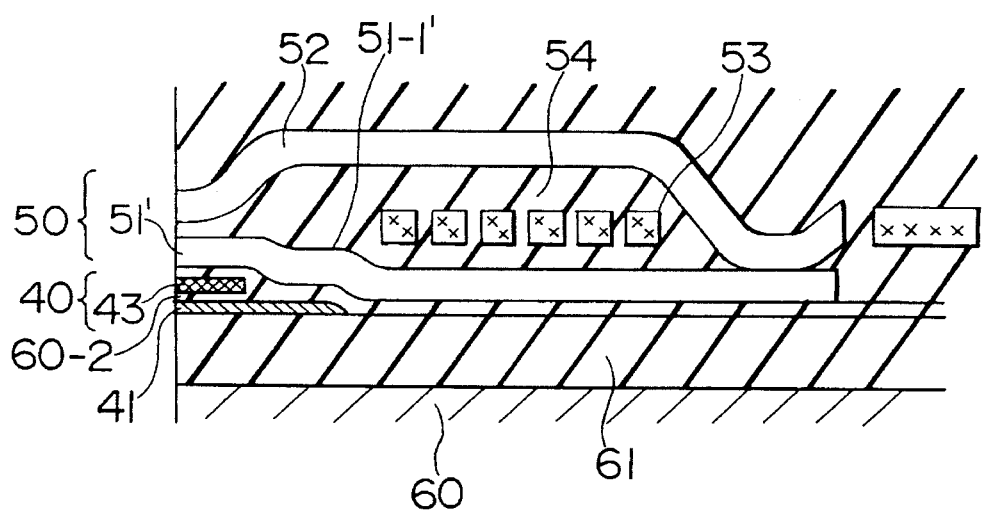
FIG. 7 is a sectional view taken on line C—C' in FIG. 6.

Referring to FIGS. 6 and 7, the description will be made as regards a combined thin film magnetic head according to a second embodiment of this invention. The combined thin film magnetic head is similar to that illustrated in FIGS. 3 and 4 except that the upper shield pattern 42 (FIG. 4) is omitted and that an under yoke pattern 51' is used as an upper shield pattern. This is because the under yoke pattern 51' is made of the same material, namely, the permalloy film, as the upper shield pattern 42. The under yoke pattern 51' has a step formed portion 51-1' which is down along an opposite side end opposite to the element side end of the magneto-resistive element 43 and further down along the second under shield side end of the under shield pattern 41. As a result, the most of the under yoke pattern 51-1' sinks at the level substantially equal to the magneto-resistive element 43. The conductor member 53 is formed so that the outer periphery portion thereof is out of the forming area for the reading part 40, namely, out of the second under shield side end of the under shield pattern 41.

While this invention has thus far been described in conjunction with a few embodiments thereof, it will readily be possible for those skilled in the art to put this invention into practice in various other manners.

What is claimed is:

1. A combined thin film magnetic head comprising reading and recording means formed through a first insulator layer on a non-magnetic substrate for magnetically reading and recording information on a magnetic recording medium, respectively, said non-magnetic substrate having a substrate side end defining an air bearing surface for said magnetic recording medium, said reading means comprising a magneto-resistive element having an element pattern, a first element side end lying in the same plane of said air bearing surface, and a second element side end opposite to said first element side end, said recording means comprising a conductor member with a coil pattern having an outer distal end portion nearest said air bearing surface, said first insulator layer having a forming area for forming said reading means and non-forming area adjoining said forming area, said reading means further comprising:

an under shield pattern being formed under said magneto-resistive element in said forming area through a second insulator layer and having a first under shield side end lying in the same plane of said air bearing surface and a second under shield side end opposite to said first under shield side end; and an upper shield pattern covering said magneto-resistive element in said forming area through said second insulator layer and having a first upper shield side end lying in the same plane of said air bearing surface and a second upper shield side end opposite to said first upper shield side end;

said recording means further comprising:

an under yoke pattern lying over said reading means and said non-forming area and having a first under yoke side end lying in the same plane of said air bearing surface, a second under yoke side end opposite to said first under yoke side end, and a sloping portion between said first and second under yoke side ends, said sloping portion sloping in a direction toward said first insulator layer and away from said air bearing surface and beginning at a distance from said air bearing surface which is further than a distance at which said second upper shield side end is from said air bearing surface; and an upper yoke pattern overlying said under yoke pattern and having a first upper yoke side end lying in the same plane of said air bearing surface and a second upper yoke side end opposite to said first upper yoke side end and connected to said second under yoke side end to form a magnetic headcore having a magnetic gap between said first under and said first upper yoke side ends, said conductor member being formed on said non-forming area through a third insulator layer between said under and said upper yoke patterns so that said coil pattern surrounds a connection portion between said second under and said second upper yoke side ends and that said outer distal end portion is spaced farther away from said air bearing surface than said second element side end and said second under and said second upper shield side ends in said forming area.

2. A combined thin film magnetic head as claimed in claim 1, wherein said upper shield pattern is smaller, in size, than said under shield pattern.

3. A combined thin film magnetic head as claimed in claim 2, wherein said upper shield pattern has a sloping portion between said first and second upper shield side ends.

4. A combined thin film magnetic head as claimed in claim 1, wherein said sloping portion begins at a distance from said air bearing surface less than a distance at which said second under shield side end is from said air bearing surface, and ends at a distance from said air bearing surface which is greater than said distance at which said second under shield side end is from said air bearing surface.

5. A combined thin film magnetic head comprising reading and recording means formed through a first insulator layer on a non-magnetic substrate for magnetically reading and recording information on a magnetic recording medium, respectively, said non-magnetic substrate having a substrate side end defining an air bearing surface for said magnetic recording medium, said reading means comprising a magneto-resistive element having an element pattern, a first element side end lying in the same plane of said air bearing surface, and a second element side end opposite to said first element side end, said recording means comprising a conductor member with a coil pattern having an outer distal end portion nearest said air bearing surface, said first insulator layer having a forming area for forming said reading means and a non-forming area adjoining said forming area, said reading means further comprising:

an under shield pattern being formed under said magneto-resistive element in said forming area through a second insulator layer and having a first under shield side end lying in the same plane of said air bearing surface and a second under shield side end opposite to said first under shield side end;

said recording means further comprising:

an under yoke pattern covering said second insulator layer, said magneto-resistive element and said non-forming area and having a first under yoke side end lying in the same plane of said air bearing surface, a second under yoke side end opposite to said first under yoke side end, and a sloping portion between said first and second under yoke side ends, said sloping portion sloping in a direction toward said first insulator layer and away from said air bearing surface and beginning at a distance from said air bearing surface which is substantially equal to a distance at which said second under shield side end is from said air bearing surface; and an upper yoke pattern overlying said under yoke pattern through a third insulator layer and having a first upper yoke side end lying in the same plane of said air bearing surface and a second upper yoke side end opposite to said first upper yoke side end and connected to said second under yoke side end to form a magnetic head-core having a magnetic gap between said first under and said first upper yoke side ends, said conductor member being formed through said third insulator layer between said under and said upper yoke patterns so that said coil pattern surrounds a connection portion between said second under and said second upper yoke side ends and that said outer distal end portion is spaced farther away from said air bearing surface than said second element side end and said second under shield side end in said forming area.

6. A combined thin film magnetic head as claimed in claim 5, wherein said under yoke pattern further comprises a second sloping portion between said first under yoke side end and said sloping portion, said second sloping portion beginning at a distance from said air bearing surface which is substantially equal to a distance at which said second element side end is from said air bearing surface.

* * * * *